(12) United States Patent
Gennai et al.

(10) Patent No.: US 8,753,002 B2
(45) Date of Patent: Jun. 17, 2014

(54) KNEADING SEGMENT AND KNEADING EQUIPMENT

(75) Inventors: Tatsuo Gennai, Takasago (JP); Shigehiro Kasai, Takasago (JP); Hideo Funahashi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 107 days.

(21) Appl. No.: 13/346,950

(22) Filed: Jan. 10, 2012

(65) Prior Publication Data

US 2012/0195155 A1 Aug. 2, 2012

(30) Foreign Application Priority Data

Feb. 2, 2011 (JP) ................................. 2011-020760

(51) Int. Cl.
*B01F 7/26* (2006.01)
(52) U.S. Cl.
USPC .............................................. 366/81; 366/84
(58) Field of Classification Search
USPC .............. 366/83, 85, 94, 81, 76.2, 76.3, 76.4, 366/76.5, 82, 84; 425/204, 209
See application file for complete search history.

(56) References Cited

U.S. PATENT DOCUMENTS

| 2,813,302 A | 11/1957 | Beck |
|---|---|---|
| 2004/0094862 A1* | 5/2004 | Sturm et al. ..................... 366/85 |
| 2005/0152214 A1* | 7/2005 | Blach ............................. 366/85 |
| 2009/0213683 A1 | 8/2009 | Fukutani et al. |

FOREIGN PATENT DOCUMENTS

| CN | 101259749 A | 9/2008 |
|---|---|---|
| FR | 1 226 289 | 7/1960 |
| JP | 5-42569 | 2/1993 |
| JP | 2009-196303 | 9/2009 |

OTHER PUBLICATIONS

Extended Search Report issued Mar. 8, 2013 in European Patent Application No. 12150134.0.

* cited by examiner

*Primary Examiner* — Tony G Soohoo
*Assistant Examiner* — Anshu Bhatia
(74) *Attorney, Agent, or Firm* — Oblon, Spivak, McClelland, Maier & Neustadt, L.L.P.

(57) ABSTRACT

A kneading segment includes plural wing portions integrally formed along an axis such that angles, around the axis, of the plural wing portions are shifted. At a part of a leading end of each wing portion where a wing leading end surface and a wing surface connect with each other, a first flow surface facilitates flow of material between the wing leading end surface and the wing surface. At a part of a base end of each wing portion where a wing surface and a wing side surface of another wing portion adjacent to each wing portion connect with each other, a second flow surface facilitates flow of material between the wing surface and the wing side surface. Since such a configuration prevents material from staying between parallel kneading segments, impurities are prevented and will not mix into normally kneaded material.

8 Claims, 8 Drawing Sheets

KNEADING SEGMENT AND KNEADING EQUIPMENT

BACKGROUND OF THE INVENTION

1. Field of the Invention

The present invention relates to a kneading segment, and kneading equipment, in which this kneading segment is employed.

2. Description of the Related Art

In general kneading equipment such as an extruding machine and a kneading machine, pellets of polymer resin serving as a base material, and powder additives are supplied into a barrel, the base material and additives are simultaneously kneaded and fed to the downstream side of the barrel by plural (in most cases, two as a pair) parallel kneading screws that are inserted in the barrel, thereby a composite resin material such as a plastic compound is manufactured.

A kneading segment is provided at a part of each kneading screw employed in kneading equipment, part which is located along the axial direction of the kneading screw. As such kneading segments, there are a rotor segment and a kneading disc segment. As shown in Japanese Patent Application Publication No. 2009-196303, for example, the kneading disc segment has plural wing portions along the axial direction.

Each wing portion of a kneading disc segment projects radially outward from a shaft center (projects from two positions 180° apart from each other in the circumferential direction), and has a substantially elliptical cross section (shape of an overall end surface including both ends on both sides), which is perpendicular to the axial direction. In addition, the wing portions are provided such that their angles, around the shaft, are different from each other (shifted by an increment of 90°, for example).

Kneading segments are arranged at the same positions, along the axial direction, of respective parallel kneading screws. Thus, when the kneading screws rotate, the wing portions of the kneading segments mesh with each other, whereby material is led to between a leading end of each wing portion and an inner wall of a barrel and to between meshing wing portions, and thus the material is kneaded.

In order to improve the degree of kneading, a gap between a leading end of one of meshing wing portions and a base end of the other wing portion (hereinafter referred to as "radial direction clearance") is reduced by, for example, increasing the length of the wing portion leading end. Similarly, a gap between a wing surface of one of meshing wing portions and a wing surface of the other wing portion (hereinafter referred to as "axial direction clearance") is reduced by, for example, increasing the thickness of the wing portions. These measures do not only improve the degree of kneading but also provides an action that material that adheres to parts forming the radial direction clearance or the axial direction clearance can scraped with the wing portions (action that kneading segment cleans itself) is also obtained.

As a type of screw used in an extruder or the like, a screw on an outer surface of which a film of diamond or the like is formed (for example, refer to Japanese Patent Application Publication No. H5-42569) is known. In order to improve the abrasion resistance, and the adherability of material, the film of diamond or the like is formed on the screw in this way.

The measure, which reduces the radial direction clearance and axial direction clearance between meshing wing portions, also deteriorates the flow condition of material that is located in the radial direction clearance. More specifically, a part of the material is made to stay between meshing wing portions. In the staying material, deterioration and chemical reaction progress with the elapse of time. Thus, the staying material becomes impurities having quality difference between themselves and normally kneaded material.

By any chance such material, which is impurities, is mixed with normally kneaded material, which leads to the deterioration of quality of extrusion extruded from kneading equipment (causes so-called contamination).

On the other hand, the screw used in extruders and the like, screw on an outer surface of which a film of diamond or the like is formed, loses its original actions of improving the abrasion resistance and the adherability of material, when the film peels off due to aging degradation or the like. More specifically, there is a fear that material adheres. Thus, degradation and chemical reaction progress in the material that adheres, and the material becomes impurities. Thus, this similarly leads to the deterioration of quality of extrusion.

In addition, if a film that peels off is mixed in material during the kneading, this leads to the deterioration of quality of extrusion extruded from kneading equipment.

In consideration of the above-mentioned situation, the present invention is made and has an object to provide a kneading segment and kneading equipment which do not generate material in which degradation and chemical reaction occurs with the elapse of time, i.e. impurities by preventing the material from staying between parallel kneading segments, and thus prevents impurities from being mixed into normally kneaded material, and thus can prevent the deterioration of quality of extrusion (can maintain high quality of extrusion).

SUMMARY OF THE INVENTION

In order to achieve the above-mentioned objects, the present invention takes the following measures.

More specifically, a kneading segment according to the present invention includes: plural wing portions integrally formed along an axis such that angles, around the axis, of the plural wing portions are shifted, wherein at a part of a leading end of each wing portion, part where a wing leading end surface and a wing surface connect with each other, a first flow surface continuing from the wing leading end surface and the wing surface is formed, and wherein at a part of a base end of each wing portion, part where the wing surface and a wing side surface of another wing portion adjacent to each wing portion connect with each other, a second flow surface continuing from the wing surface and the wing side surface is formed.

According to such a configuration, with the first flow surface formed at the leading end of the wing portion, an effect that facilitates flow toward wing surface side can be imparted to material located at the part where the wing leading end surface and the wing surface connect with each other. More specifically, if the wing leading end surface and wing surface intersect with each other at right angle (if the first flow surface is not formed), there is a right-angle boundary at the intersecting part. Thus, it becomes difficult for the material to pass this intersecting part, which causes the stay. Such a defect can be resolved by the formation of the first flow surface.

Simultaneously, with the second flow surface formed at the base end of the wing portion, an effect that facilitates flow toward wing surface side can be imparted to the material that is located at the part where the wing surface and the wing side surface connect with each other. More specifically, if the wing surface and wing side surface intersect with each other at right angle (if the second flow surface is not formed), the material easily clogs at this intersecting part, which causes the stay. Such a defect can be resolved by the formation of the second flow surface.

In addition, between parallel and meshing kneading segments that rotate, a first flow surface of one wing portion and a second flow surface of the other wing portion repeat following successive motions that they approach each other from different directions, and, after they become the closest to each other, they separate from each other in different directions, and in addition, a second flow surface of the one wing portion and a first flow surface of the other wing portion also repeat the same motions (hereinafter, these motions are referred to as "passing each other"). Thus, as a synergistic effect of this first flow surface and second flow surface, the material can be prevented from clogging.

Since material can be prevented from staying in this way, material in which degradation and chemical reaction occurs with elapse of time is not generated. Thus, the kneading equipment extrudes high-quality extrusion without impurities.

As structures of the kneading segment, there are an assembly structure that wing portions, which are adjacent to each other in the axial direction, are each formed separately as a plate-like disc, and the wing portions can be attached to and removed from a spline shaft serving as a rotation center, and an integrated structure that plural wing portions are integrally formed such that they are adjacent to each other in the axial direction. As premises, a kneading segment of the present invention is the integrated structure.

The first flow surface may be formed by a convex-curved surface, and the second flow surface may be formed by a concave-curved surface.

In this case, a radius of curvature of the concave-curved surface formed at the second flow surface may be larger than a radius of curvature of the convex-curved surface formed at the first flow surface. In addition, a radius of curvature of the concave-curved surface formed at the second flow surface can be at least 20% of a thickness of the wing portion.

By forming in this way, a gap between opposing first flow surface and second flow surface can be further reduced. More specifically, the first flow surface and the second flow surface can be made closer. Thus, even if material is likely to stay between opposing first flow surface and second flow surface, the material can be scraped out. As a result, an effect of preventing material from staying is also improved.

When the radius of curvature of the concave-curved surface formed at the second flow surface is at least 20% of the thickness of the wing portion, an assured and sufficient effect that facilitates flow of material that is located at a part where the wing surface and wing side surface connect with each other is confirmed. When the radius of curvature is less than 20%, slight variation may occur in certainty.

The first flow surface may be formed by a sloped surface, and the second flow surface may be formed by a sloped surface.

The first flow surface may be formed by a convex-curved surface, and the second flow surface may be formed by a sloped surface.

The first flow surface may formed by a sloped surface, and the second flow surface may be formed by a concave-curved surface.

On the other hand, a kneading equipment according to the present invention, includes: plural parallel kneading screws, wherein the kneading segment according to the present invention is provided at a part of each kneading screw, part which is located along the axis of the kneading screw, and the kneading segments are disposed such that wing portions of the kneading segments mesh with each other.

In the above-mentioned kneading equipment according to the present invention, a radius of curvature of a convex-curved surface formed at the first flow surface and a radius of curvature of a concave-curved surface formed at the second flow surface may be each substantially twice a clearance between meshing wing portions.

Here, making each of the radii of curvature of the first flow surface and the second flow surface to be substantially twice a clearance between wing portions means a range of approximately 1.5 times or more and less than 2.5 times. In a case of the range of 1.5 times or more and less than 2.5 times, an assured and sufficient effect that facilitates flow of material that is located at the part where the wing leading end surface and wing surface connect with each other is confirmed, and also an assured and sufficient effect that facilitates flow of material that is located at the part where the wing surface and the wing side surface connect with each other is confirmed.

In other words, an assured and sufficient effect of preventing material from staying between meshing first flow surface and second flow surface (effect that prevents clogging and scrapes out) is confirmed.

Since the kneading segment and kneading equipment according to the present invention can prevent material from staying between parallel kneading segments, material in which degradation and chemical reaction occurs with the elapse of time, i.e. impurities is not generated, and impurities are prevented from being mixed into normally kneaded material, and thus the deterioration of quality of extrusion is prevented (the quality of extrusion can be maintained high).

BRIEF DESCRIPTION OF THE DRAWINGS

FIG. 5 are plan views of enlarged main parts, each view showing a state where the wing portions mesh with each other in the kneading segment according to a first embodiment of the present invention, with FIG. 5A showing a case where a convex-curved surface of a first flow surface and a concave-curved surface of a second flow surface have the same radius of curvature, and FIG. 5B showing a case where the concave-curved surface of the second flow surface has a larger radius of curvature than the convex-curved surface of the first flow surface;

FIG. 7 are plan views of enlarged main parts, each view showing a state where wing portions mesh with each other in a kneading segment according to the present invention, with FIG. 7A showing a second embodiment, FIG. 7B showing a third embodiment, and FIG. 7C showing a fourth embodiment.

DESCRIPTION OF THE PREFERRED EMBODIMENTS

Hereinafter, embodiments of the present invention will be explained with reference to the drawings.

FIGS. 1 to 5 show a first embodiment of a kneading segment 1 according to the present invention. FIG. 6 is a lateral cross-sectional view schematically showing kneading equipment 2, in which the kneading segment 1 can be employed.

As shown in FIG. 6, the kneading equipment 2 has a barrel 4 including a hollow space inside thereof, and plural parallel kneading screws 3 that are provided in the hollow space of this barrel 4. The kneading segment 1 is provided at a part, located along the axial direction, of each kneading screw 3. The kneading segments 1 are provided at the same positions, along the axial direction, of the kneading screws 3, and thus are disposed side by side in the kneading equipment 2 (in the barrel 4).

In the kneading equipment 2, the kneading screws 3 rotate in the same direction in the barrel 4 so as to continuously knead material and simultaneously feed it along the axial direction of the kneading screw 3, and, in the middle of the feeding, the kneading segments 1 knead the material.

In the following explanation, the direction along the rotational axis of the kneading screw 3 is assumed to be the axial direction for the explanation of the kneading equipment 2. This axial direction matches the horizontal direction on FIG. 6 (longitudinal direction of the screw). In addition, the left side of FIG. 6 is defined as the upstream side of this axial direction, and the right side thereof is defined as the downstream side thereof for the explanation of the kneading equipment 2. Further, two kneading screws 3 are made to be a pair, and are arranged side by side along a direction, which is perpendicular to the paper surface of FIG. 6, in the kneading equipment 2 (the hollow space of barrel 4). This direction along which the kneading screws 3 are arranged side by side is assumed to be the parallel direction or right-left direction.

The barrel 4 is formed in a cylindrical shape that is long along the axial direction. The hollow space, which is shaped in a spectacle-frame-shape that is long along the axial direction, is formed in the barrel 4. The two kneading screws 3 are rotatably inserted in this hollow space. The two kneading screws 3 are disposed with their axial directions being parallel with each other.

The barrel 4 has a material supply port 5 at the upstream side of the axial direction, and material can be supplied to the hollow space through this material supply port 5. A heating device (not shown), in which an electric heater, heated oil or the like is used, is provided to the barrel 4 as necessary. The material that is supplied from the material supply port 5 is heated as necessary with this heating device.

In the illustrated example, a hopper 6 that can supply material, additives and the like to the material supply port 5, and an opening portion 8 that discharges gas, which volatilizes from kneaded material, to the outside of the barrel 4 are provided.

The kneading screw 3 includes a shaft (not shown), such as a spline shaft that is axially long, having a function of preventing the segment from rotating. This spline shaft penetrates plural segment members and fixes them.

There are various types of the segment members constituting the kneading screws 3. By combining plural types of segment members, a feed section 10 that feeds material, a kneading section 11 that kneads the material, an extruding section 12 that sends kneaded material to the downstream side, and the like are provided over respective predetermined ranges in the axial direction of the kneading screws 3.

The feed section 10 is configured by plural screw segments 13 arranged in the axial direction. The screw segments 13 include a screw flight (not shown) twisted in a spiral shape in the axial direction. The screw flight twisted in a spiral shape rotates so that the screw segments 13 feed the material from the upstream side to the downstream side.

The extruding section 12 also has plural screw segments 13 along the axial direction. Similarly to the feed section 10, the screw segments 13 include a screw flight twisted in a spiral shape. The pitch of the screw flight may be made constant for the screw segments 13 of the extruding section 12; however, in the illustrated example, the screw segments 13 of the extruding section 12 are formed such that screw segments 13 positioned more downstream have smaller pitch of screw flight (have larger twist angle of screw flight), and thus the moving speed of the material is made lower at more downstream side so that the material can be pressurized.

The kneading section 11 has a kneading disc segment and plural rotor segments. Focusing on the kneading disc segment in the present embodiment, this kneading disc segment is called a "kneading segment 1". It should be noted that the kneading section 11 in the illustrated example includes one kneading segment 1 and six rotor segments 15.

The rotor segments 15 have a plurality (e.g., two) of flights for kneading, the flights being twisted in a spiral shape in the axial direction. The rotor segments 15 extrude the material to the downstream side, and simultaneously shear the material with these kneading flights.

The kneading segment 1 is provided adjacent to the downstream side of the rotor segment 15 which is disposed on the most downstream side. In addition, the above screw segment 13 of the extruding section 12 is adjacent to the downstream side of this kneading segment 1. In other words, the kneading segment 1 is positioned between the rotor segment 15 and screw segment 13.

Figure 1:
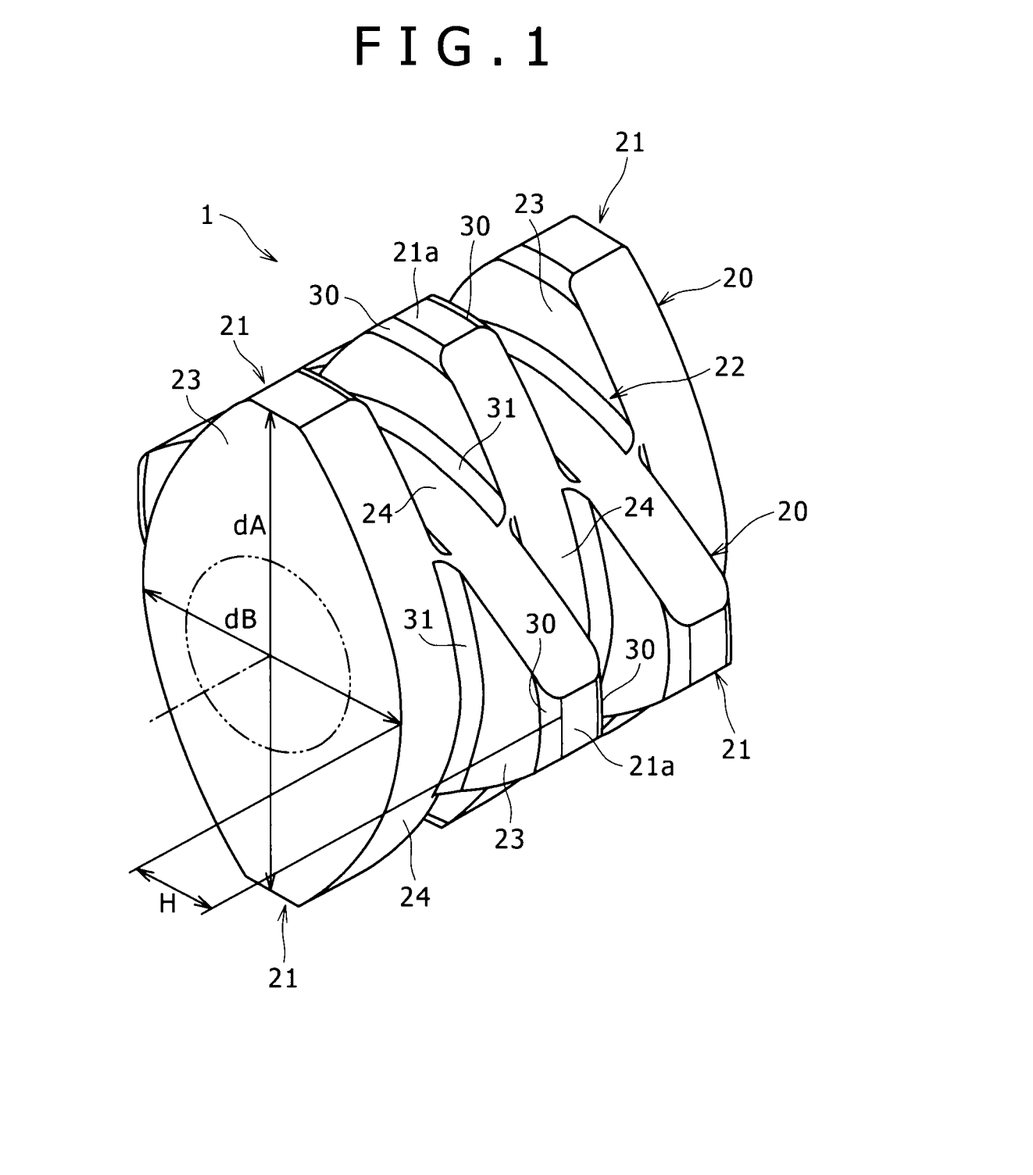
FIG. 1 is a perspective view showing a kneading segment according to a first embodiment of the present invention.
Figure 2:
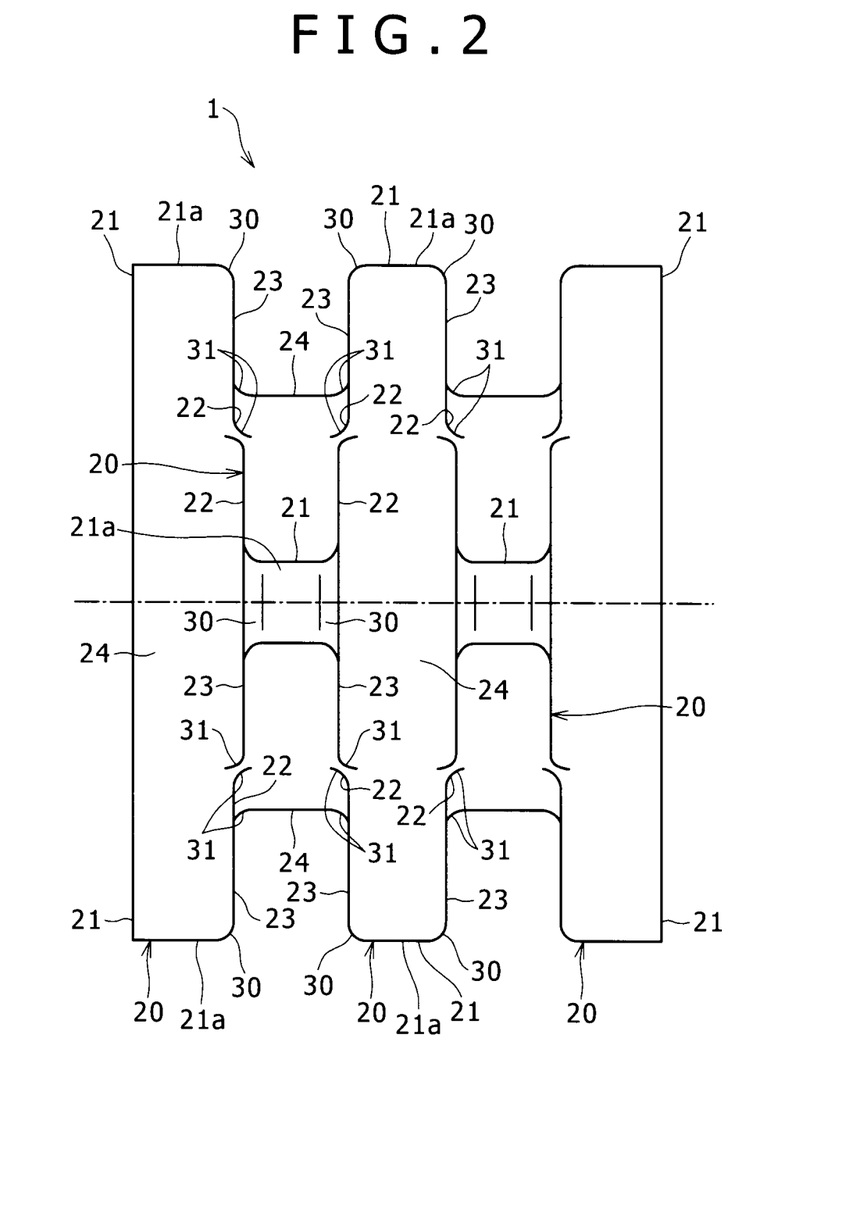
FIG. 2 is a side view showing the kneading segment according to a first embodiment of the present invention.

As shown in FIGS. 1 and 2, the kneading segment 1 has plural wing portions 20 adjacent to each other along the axial direction. The wing portions 20 have the same shape. Each wing portion 20 projects radially outward from the shaft center (at two positions 180° apart from each other in the circumferential direction) and has leading ends 21, 21 at both ends thereof. The leading end 21 corresponds to a part, which is most distant from the shaft center, of the wing portion 20. More specifically, when the wing portions 20 rotate around the shaft center, the leading ends 21, 21 on both sides closely pass over the inner circumferential surface of the barrel 4 so that material that adhere to the inner circumferential surface of the barrel 4 is simultaneously scraped and knead.

The wing portion 20 is formed such that it gradually becomes wider from the leading ends 21 on both sides to the shaft center, and becomes the widest around the shaft center. Thus, the wing portion 20, as viewed along the direction perpendicular to the axial direction, is formed in a substantially elliptical shape that is a shape of its overall end surface including the leading ends 21, 21 on both sides.

The wing portions 20 are integrally formed along the axial direction such that angles, around the axis, of wing portions 20 are different from each other. In the first embodiment, the wing portions 20 are shifted by an increment of 90° around the axis. Since the wing portions 20 are integrally formed along the axial direction, relative angles between the wing portions 20 are unchanged (fixed).

In the wing portion 20, parts other than the leading end 21 are defined as below. More specifically, assuming that the wing portion 20 has the end surface formed in a substantially elliptical shape as described above, a hypothetical line passing through the shaft center and connecting the leading ends 21, 21 on both sides corresponds to a long diameter dA of the elliptical shape, and a short hypothetical line passing through the shaft center and being orthogonal to this hypothetical line of long diameter dA corresponds to a short diameter dB of the elliptical shape.

Since wing portions 20 are shifted by an increment of 90° around the axis, a leading end 21 of one of wing portions 20, 20, which are adjacent along the axial direction, radially projects by a projection amount H from a position of short radius dB of the other wing portion 20. Here, the radial projection amount H of the leading end 21 has a length of H=(dA-dB)/2.

In such a wing portion 20, a base part where leading ends 21 radially project from an adjacent wing portion 20 (part where a base point of the radial projection amount H, base point which is on the opposite side to the leading end 21, passes) is a base end 22 of the wing portion 20. This base end 22 is formed in a circular shape around the shaft.

Also in the wing portion 20, a surface connecting the base end 22 and the leading end 21 and being orthogonal to the axial direction is a wing surface 23 of the wing portion 20, and a surface corresponding to the outer periphery of the wing portion 20 and existing along the axial direction (a part that corresponds to the thickness of the wing portion 20 but does not include end surfaces located at the leading ends and existing along the axial direction) is a side surface 24 of the wing portion 20. The surface located at the leading end 21 of the wing portion 20 and existing along the axial direction (end surface becoming the radially outer end of the leading end 21) is referred to as a "wing leading end surface 21a" below.

Figure 3:
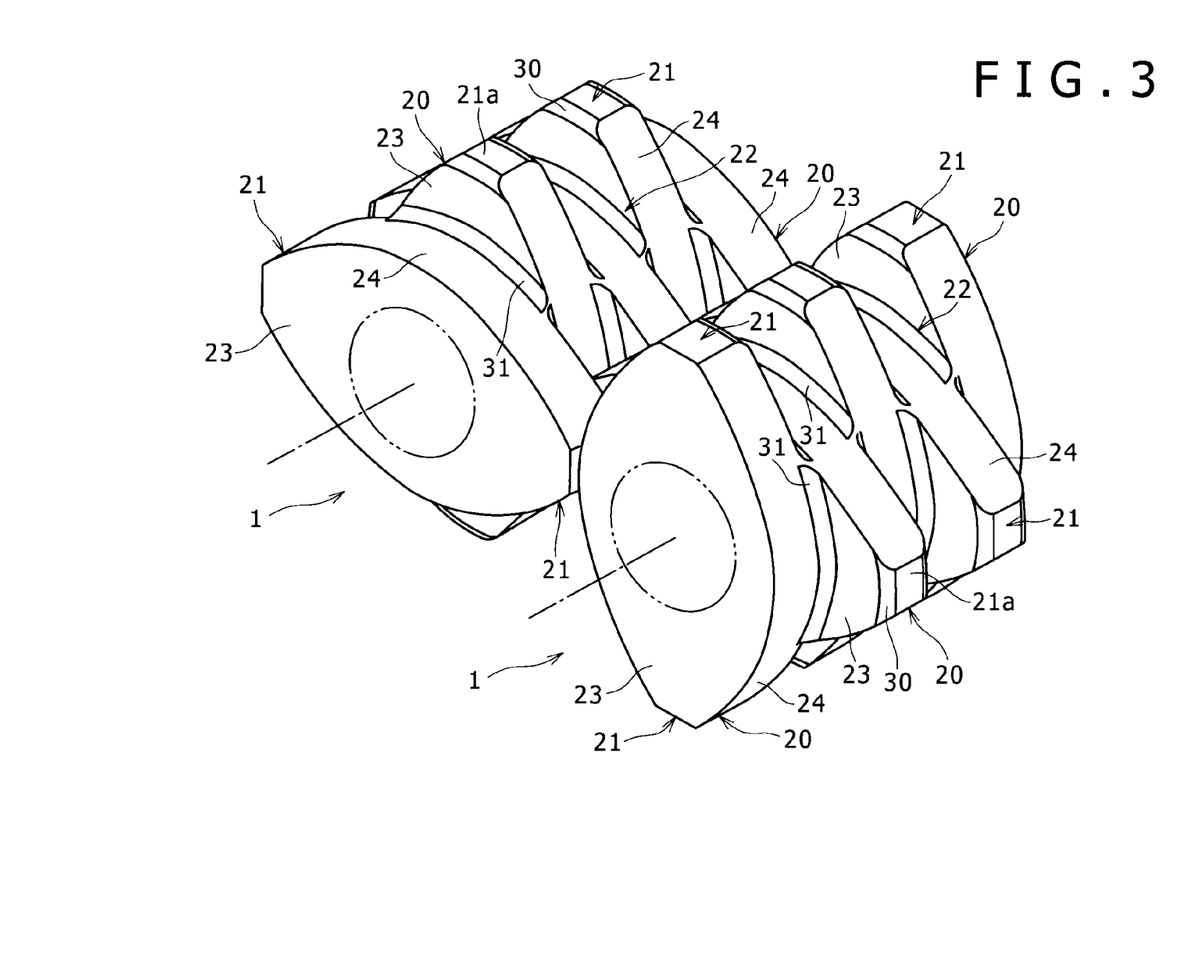
FIG. 3 is a perspective view showing a state where the kneading segments according to a first embodiment of the present invention are parallel with each other, and wing portions mesh with each other.
Figure 4:
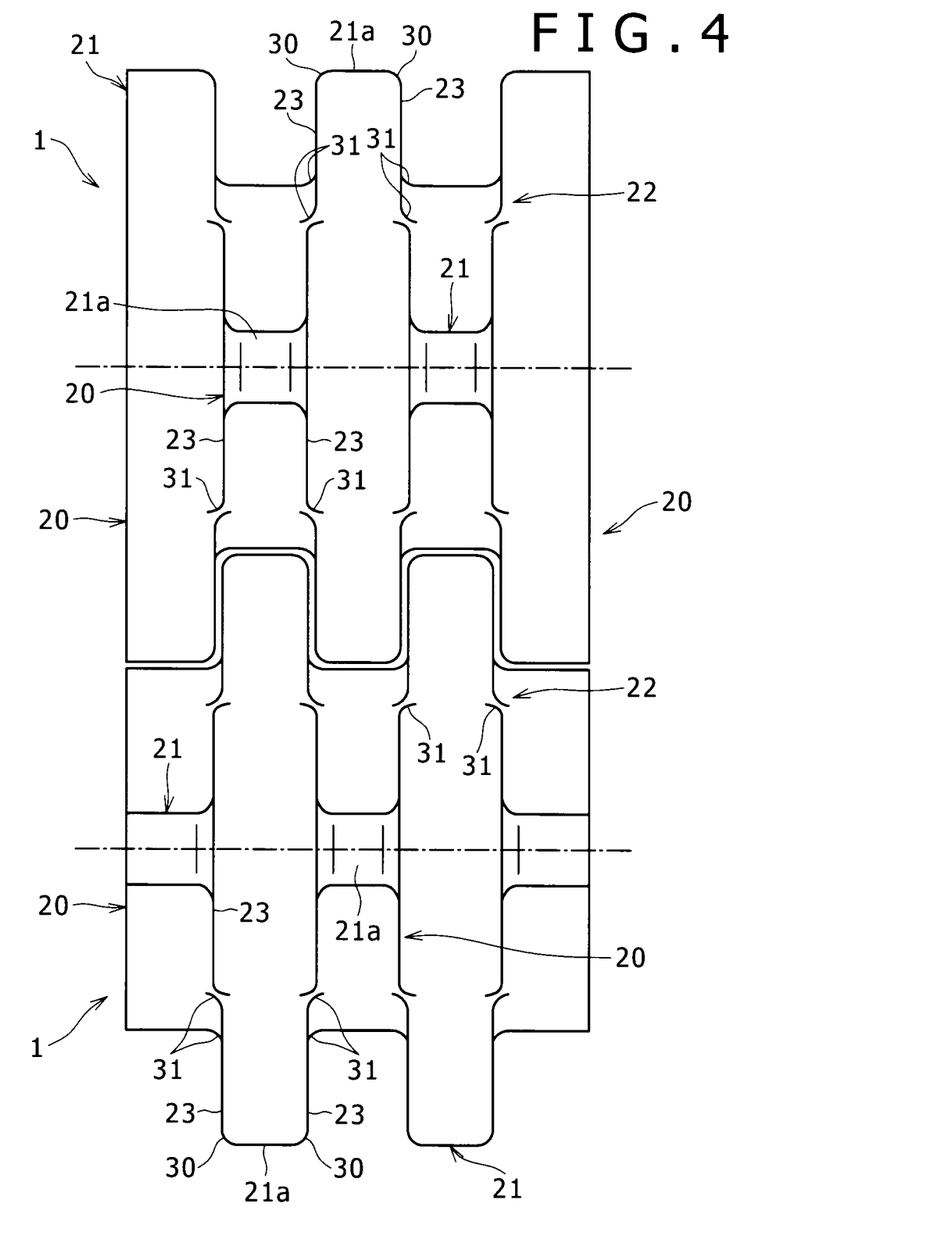
FIG. 4 is a plan view showing a state where the kneading segments according to a first embodiment of the present invention are parallel with each other, and wing portions mesh with each other.

In the kneading equipment 2 (in the barrel 4), the kneading segments 1 are disposed side by side as described above such that wing portions 20 of one kneading segment 1 mesh with wing portions 20 of the other kneading segment 1, as shown in FIGS. 3 and 4.

More specifically, relative rotation angles between the kneading segments 1 and 1 are set so that a leading end 21 of a wing portion 20 (wing leading end surface 21a) of one kneading segment 1 and a base end 22 (wing side surface 24) of the wing portion 20 of the other kneading segment 1 rotate while they approach each other from different directions, and after their distance becomes the closest, they separate from each other in different directions (they pass each other), and further a base end 22 (wing side surface 24) of a wing portion 20 of one kneading segment 1 and a leading end 21 of a wing portion 20 (wing leading end surface 21a) of the other kneading segment 1 rotate while they pass each other.

A part of the leading end 21 of the wing portion 20, part where the wing leading end surface 21a and wing surface 23 connect with each other, a first flow surface 30 that facilitates flow of material between the wing leading end surface 21a and the wing surface 23 is formed.

In the first embodiment, this first flow surface 30 is formed by a convex-curved surface. This convex-curved surface continues from the wing leading end surface 21a and the wing surface 23. More specifically, there is no stepped boundary between the wing leading end surface 21a and the wing surface 23. In addition, this convex-curved surface is formed so as to depict a curved surface having a single radius of curvature between the wing leading end surface 21a and the wing surface 23.

In addition, a part of a base end 22 of a wing portion 20, part where a wing surface 23 and a wing side surface 24 of another wing portion 20 adjust to this wing portion 20 connect with each other, a second flow surface 31 that facilitates flow of material between this wing surface 23 and wing side surface 24 is formed.

In the first embodiment, this second flow surface 31 is formed by a concave-curved surface. This concave-curved surface continues from the wing surface 23 and the wing side surface 24. More specifically, there is no stepped boundary between the wing surface 23 and the wing side surface 24. In addition, this concave-curved surface is formed so as to depict a curved surface having a single radius of curvature between the wing surface 23 and the wing side surface 24.

Due to the formation of such first flow surface 30 and second flow surface 31, when parallel and meshing kneading segments 1 and 1 rotate (refer to FIGS. 3 and 4), a first flow surface 30 of one wing portion 20 and a second flow surface 31 of the other wing portion 20 pass each other between the kneading segments 1 and 1, and in addition, a second flow surface 31 of the one wing portion 20 and a first flow surface 30 of the other wing portion 20 pass each other between the kneading segments 1 and 1.

Figure 5A:
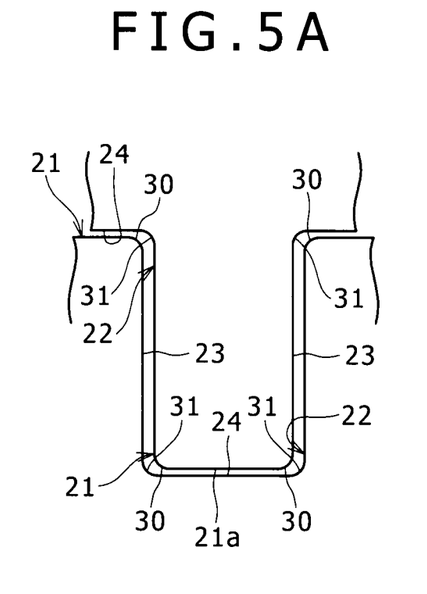
Figure 6:
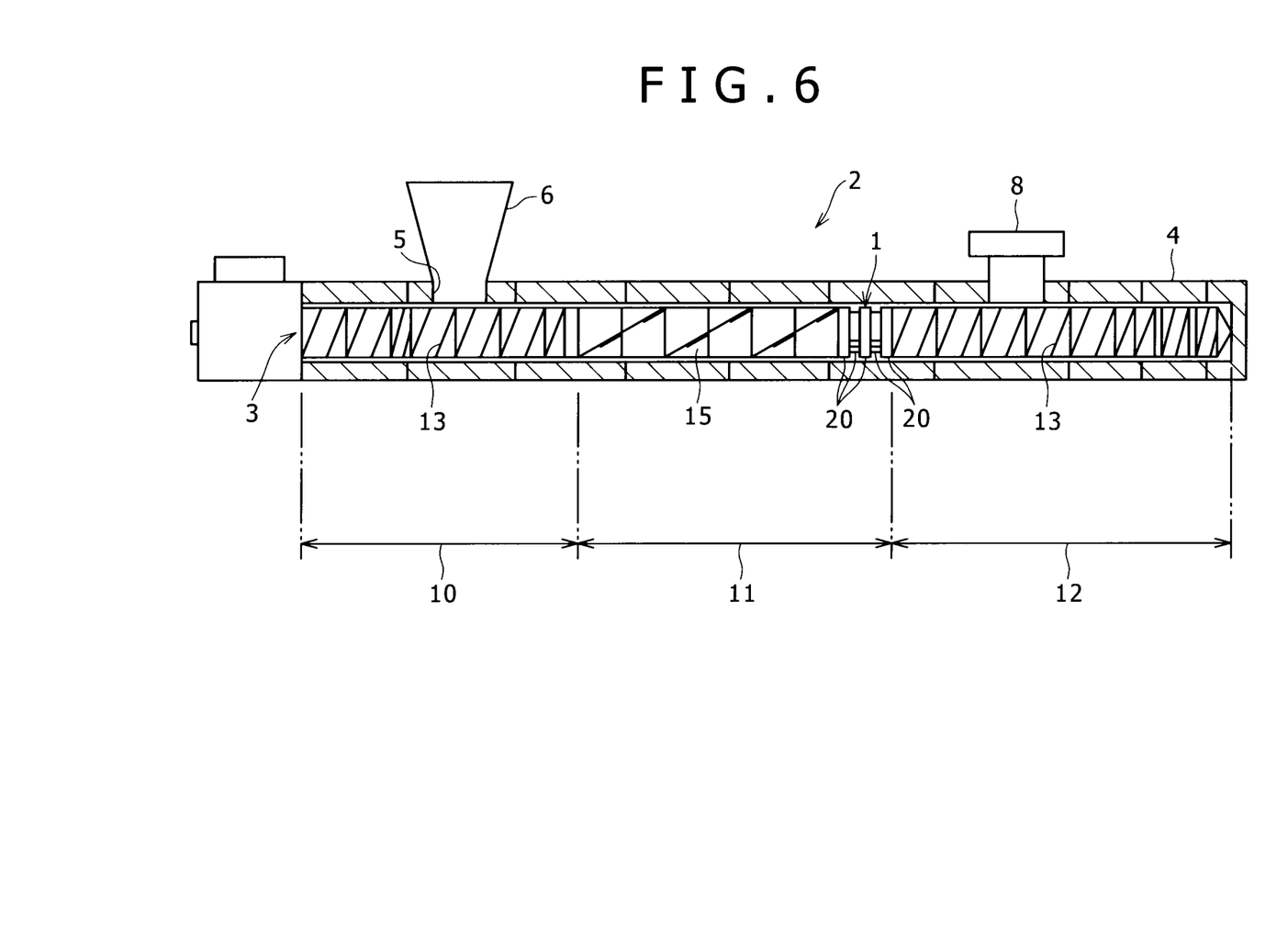
FIG. 6 is a lateral cross-sectional view schematically showing kneading equipment.

As enlarged in FIG. 5A, a radius of curvature of a convex-curved surface formed at the first flow surface 30 and a radius of curvature of a concave-curved surface formed at the second flow surface 31 may be made the same. However, the radii of curvature do not have to be made the same.

Figure 5B:
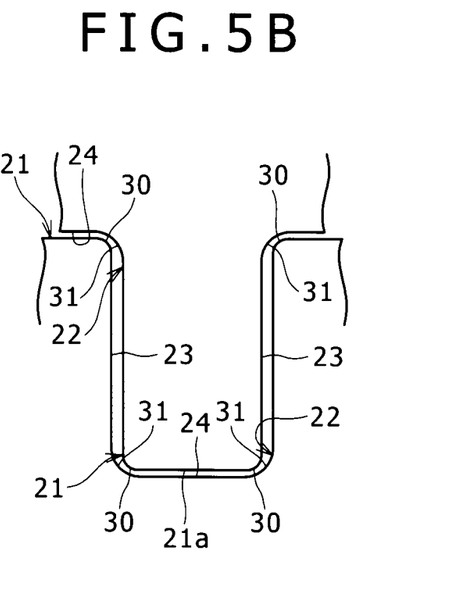

For example, as shown in FIG. 5B, the radius of curvature of the concave-curved surface formed at the second flow surface 31 may be made larger than the radius of curvature of the convex-curved surface formed at the first flow surface 30. By making in this way, a gap between opposing first flow surface 30 and second flow surface 31 can be further reduced. More specifically, since the first flow surface 30 and the second flow surface 31 can be made closer to each other, material is more easily scraped out, and thus the effect preventing the stay is improved.

In addition, the radius of curvature of the convex-curved surface formed at the first flow surface 30 is favorably set to substantially twice (approximately 1.5 times or more and less than 2.5 times) a clearance between meshing wing portions 20 and 20 (between opposing wing surfaces 23 and 23, or between a wing leading end surface 21a and a wing side surface 24 that oppose to each other).

Similarly, the radius of curvature of the concave-curved surface formed at the second flow surface 31 is favorably set to substantially twice (approximately 1.5 times or more and less than 2.5 times) a clearance between meshing wing portions 20 and 20 (between opposing wing surfaces 23 and 23, or between a wing leading end surface 21a and a wing side surface 24 that oppose to each other).

A favorable effect is also obtained when the radius of curvature of the concave-curved surface formed at the second flow surface 31 is set to at least 20% of the thickness of the wing portion 20.

In order to produce a kneading segment 1 of such a configuration, a material formed by forging, casting or the like is machined by milling or the like to form a wing portion 20. Here, a machining allowance necessary for forming a first flow surface 30 is left for a leading end 21 of a wing portion 20, and the first flow surface 30 is machined. In addition, a machining allowance necessary for forming a second flow surface 31 is left a part between a base end 22 of a wing portion 20 and a wing side surface 24 of a wing portion 20 adjacent to this wing portion 20 (corner part), and the second flow surface 31 is machined.

Next, the operating conditions of the kneading equipment 2 will be explained.

When the kneading equipment 2 is operated, the parallel kneading screws 3 rotate in the same direction in the barrel 4, and material, which is supplied into the barrel 4 via the material supply port 5, is simultaneously kneaded and fed in the axial direction of the kneading screws 3.

Material having reached the kneading segments 1, 1, which are parallel with each other at the same position in the axial direction of each kneading screw 3, is kneaded by the wing portions 20, 20 of the kneading segments 1, 1 in such a manner that the material is scraped off from the inner peripheral surface of the barrel 4 by the leading ends 21, 21 of these wing portions 20, 20 and is simultaneously kneaded between the wing portions 20 and 20 meshing with each other.

Here, the material at a part of the leading end 21 of each of the wing portions 20, part where the wing leading end surface 21a and wing surface 23 connect with each other, receives the flow facilitating effect from the first flow surface 30, and almost all the material flows so as to be extruded to the wing surface 23 side. More specifically, the material does not stay in a gap between the leading end 21 of the wing portion 20 and the base end 22 of a wing portion 20, which mesh with each other (radial direction clearance). The material having flowed to the wing surface 23 side is made to smoothly flow between the opposing wing surfaces 23 and 23 (axial direction clearance) such that it flows along the wing surfaces 23 toward the base ends 22, 22 of the wing portions 20, 20.

At the same time, the material at a part of the base end 22 of each of the wing portions 20, part where the wing surface 23 and the wing side surface 24 connect with each other, receives the flow facilitating effect from the second flow surface 31, and almost all the material flows so as to be extruded to the wing surface 23 side. Similarly, the material does not stay at the aforementioned radial direction clearance. The material having flowed to the wing surface 23 side is made to smoothly flow between the opposing wing surfaces 23 and 23 such that it flows along the wing surfaces 23 toward the base end 22 of the wing portion 20 in one of the kneading segments 1. If focusing on an adjacent wing portion 20 of the other kneading segment 1, almost all the material is made to flow toward the leading end 21.

The flow facilitating effect imparted to the material in this way acts as synergistic effect from this first flow surface 30 and second flow surface 31, whereby the stay and clogging of the material is reliably prevented, and the stay of the material is eliminated.

Thus, with the kneading equipment 2, in which the kneading segment 1 according to the present invention is employed, material can be prevented from staying in the kneading section 11, and thus kneaded material in which degradation or chemical reaction occurs with the elapse of time is not produced. As a result, the kneading equipment 2 can extrude high-quality extrusion without impurities.

Figure 7A:
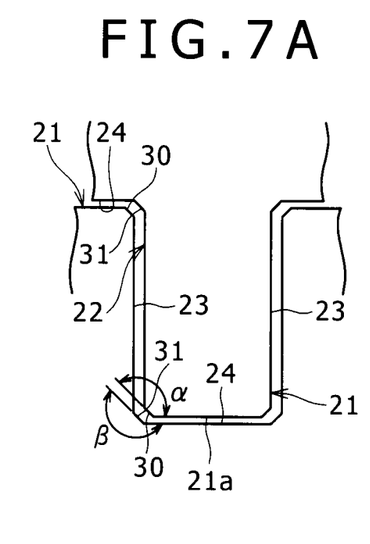

FIG. 7A is a plan view of an enlarged main part, the view showing a state where the wing portions 20 mesh with each other in the kneading segment 1 according to a second embodiment of the present invention. In the second embodiment, the first flow surface 30 formed at a part of the leading end 21 of the wing portion 20, part where the wing leading end surface 21a and wing surface 23 connect with each other, is formed by a sloped surface. In addition, the second flow surface 31 formed at a portion of the base end 22 of the wing portion 20, part where the wing surface 23 and the wing side surface 24 connect with each other, is also formed by a sloped surface.

The sloped surface forming the first flow surface 30 has a single surface formed so as to have the same bend angle (interior angle α: 135°) between itself and each of the wing leading end surface 21a and wing surface 23. In addition, the sloped surface forming the second flow surface 31 has a single surface formed so as to have the same bend angle (interior angle β: 225° between itself and each of the wing surface 23 and the wing side surface 24.

Thus, opposing first flow surface 30 and second flow surface 31 are parallel (parallel surfaces) with each other. It should be noted that the width of each sloped surface in a direction parallel to the shaft-line direction may be set to a dimension corresponding to the radius of curvature of the curved surface in the first embodiment.

According to the present invention, the kneading segment 1 having such a first flow surface 30 and second flow surface 31 can reliably prevent the stay and clogging of material. Therefore, the kneading equipment 2, in which this kneading segment 1 is employed, can produce high-quality extrusion without impurities.

Figure 7B:
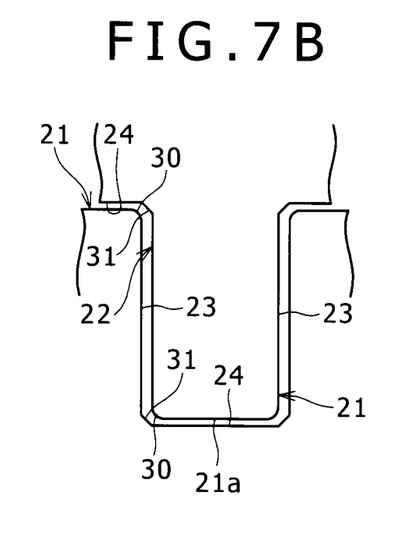

FIG. 7B is a plan view of an enlarged main part, the view showing a state where the wing portions 20 mesh with each other in a kneading segment 1 of a third embodiment of the present invention. In the third embodiment, a first flow surface 30 formed at a part of the leading end 21 of the wing portion 20, part where the wing leading end surface 21a and wing surface 23 connect with each other, is formed by a convex-curved surface. In addition, a second flow surface 31 formed at a part of a base end 22 of a wing portion 20, part where a wing surface 23 and a wing side surface 24 connect with each other, is formed by a sloped surface.

Figure 7C:
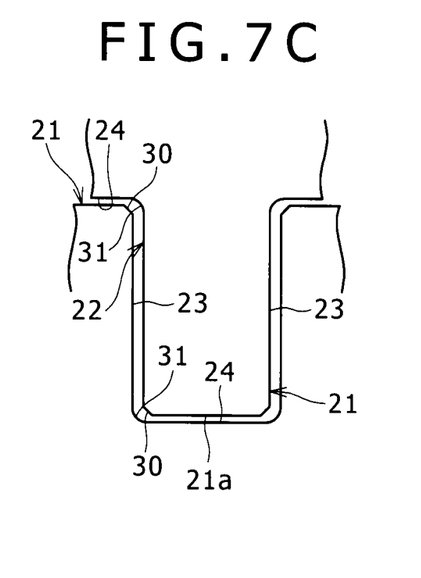

FIG. 7C is a plan view of an enlarged main part, the view showing a state where wing portions 20 and 20 mesh with each other in a kneading segment 1 according to a fourth embodiment of the present invention. In the fourth embodiment, the first flow surface 30 formed at a part of the leading end 21 of the wing portion 20, part where the wing leading end surface 21a and wing surface 23 connect with each other, is formed by a sloped surface. In addition, the second flow surface 31 formed at a part of the base end 22 of the wing portion 20, part where the wing surface 23 and wing side surface 24 connect with each other, is formed by a concave-curved surface.

According to the present invention, a kneading segment 1 including a combinations of such first flow surface 30 and second flow surface 31 also can reliably prevent material from staying and clogging. Thus, kneading equipment 2, in which this kneading segment 1 is employed, produces high-quality extrusion without impurities.

Figure 8:
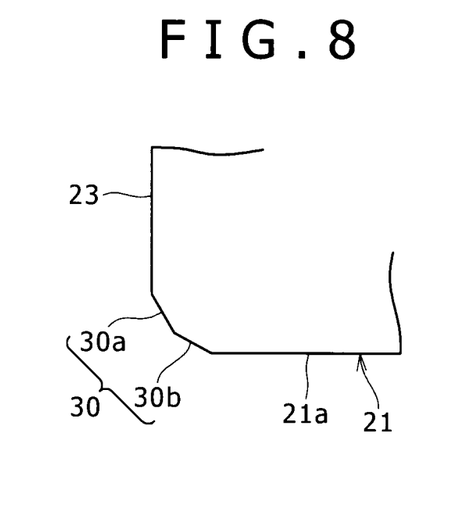
FIG. 8 is a plan view of an enlarged main part (leading end of wing portion), the view showing a kneading segment according to a fifth embodiment of the present invention.

FIG. 8 shows an enlarged leading end 21 of the wing portion 20 in the kneading segment 1 according to a fifth embodiment of the present invention. In the fifth embodiment, the first flow surface 30 formed at a part of the leading end 21 of the wing portion 20, part where the wing leading end surface 21a and wing surface 23 connect with each other, is formed as a multi-step sloped surface structure having two sloped surfaces 30a, 30b formed so as to have the same bend angle (interior angle: 150°) between itself and the wing surface 23 and wing leading end surface 21a, respectively.

It should be noted that such a multi-step sloped surface structure is not only formed by the combination of the two sloped surfaces 30a, 30b, but can also be formed by a combination of three or more sloped surfaces. In addition, the bend angles relative to the wing leading end surface 21a and wing surface 23 do not have to be made the same angle, nor are they numerically limited.

Such a multi-step sloped surface structure can be replaced with the first flow surface 30 of the second embodiment (refer to FIG. 7A) and the first flow surface 30 of the fourth embodiment (refer to FIG. 7C). In addition, the multi-step sloped surface structure can be adopted instead of a second flow surface 31 formed by a sloped surface as in the second embodiment (refer to FIG. 7A) and the third embodiment (refer to FIG. 7B), although this illustration is omitted. It should be noted that, in the third embodiment, the fourth embodiment, and the fifth embodiment, the radii of curvature of the convex-curved surface and concave-curved surface, and the width, along a direction parallel to the axial direction, of the sloped surface or multi-step sloped surface may be set to a dimension corresponding to the radius of curvature of the curved surface in the first embodiment.

The present invention is not limited to the above embodiments. The shape, structure, material, combinations and the like of each member can be modified as appropriate within a scope not departing from the spirit of the invention.

For example, kneading equipment 2 is not only a two-shaft extruder, which includes two kneading screws 3, of completely intermeshing type and also of same-direction rotating type, but the kneading equipment 2 also includes three or more shafts. In addition, the kneading screws 3 may rotate in different directions. The kneading segment 1 may include a transition piece disposed between a kneading disc segment and another segment and having a part similarly shaped as a kneading disc.

In order to make material stay in the kneading segment 1 for a longer time, improve the distributive mixing performance, or the like, a relative angle between wing portions 20 that are adjacent along the axial direction in each kneading segment 1 may be set in a range of 30° or more and less than 80°. The relative angle can be set to an angle exceeding 90° in some cases.

In addition, the arrangements of the feed section 10, the kneading section 11 and the extruding section 12 in the kneading screw 3, and the numbers thereof can be arbitrarily changed in accordance with the types of materials and kneading purpose.

As surface treatments subjected to the wing portions 20, diamond-like carbon, chrome plating, nickel plating, and a film of fluorine resin or the like can be employed, for example.

What is claimed is:

1. A kneading segment, comprising:
   plural wing portions integrally formed along an axis of the kneading segment such that angles, around the axis, of the plural wing portions are shifted, wherein
   each of said wing portions comprises a leading end having a leading end surface which is a surface of the wing portion most distant from the axis and, at a part of the leading end of each wing portion where the wing leading end surface and a wing surface orthogonal to the axis connect with each other, a first flow surface continuing from the wing leading end surface and the wing surface is formed, and wherein
   at a part of a base end of each wing portion, where the orthogonal wing surface and a wing side surface of another wing portion adjacent to each wing portion connect with each other, a second flow surface continuing from the wing surface and the wing side surface is formed,
   wherein the first flow surface is formed by a convex-curved surface, and the second flow surface is formed by a concave-curved surface.

2. The kneading segment according to claim 1, wherein a radius of curvature of the concave-curved surface formed at the second flow surface is larger than a radius of curvature of the convex-curved surface formed at the first flow surface.

3. The kneading segment according to claim 1, wherein a radius of curvature of the concave-curved surface formed at the second flow surface is at least 20% of a thickness of the wing portion.

4. The kneading segment according to claim 1, wherein the first flow surface is formed by a sloped surface, and the second flow surface is formed by a sloped surface.

5. The kneading segment according to claim 1, wherein the first flow surface is formed by a convex-curved surface, and the second flow surface is formed by a sloped surface.

6. The kneading segment according to claim 1, wherein the first flow surface is formed by a sloped surface, and the second flow surface is formed by a concave-curved surface.

7. Kneading equipment, comprising:
   plural parallel kneading screws, wherein
   the kneading segment according to claim 1 is provided at a part of each kneading screw, part which is located along the axis of the kneading screw, and the kneading segments are disposed such that wing portions of the kneading segments mesh with each other.

8. The kneading equipment according to claim 7, wherein a radius of curvature of a convex-curved surface formed at the first flow surface and a radius of curvature of a concave-curved surface formed at the second flow surface are each substantially twice a clearance between meshing wing portions.

* * * * *